No. 608,103. Patented July 26, 1898.
M. R. BROWN.
DEVICE FOR KEEPING LIDS ON BOILERS.
(Application filed Sept. 4, 1897.)
(No Model.)
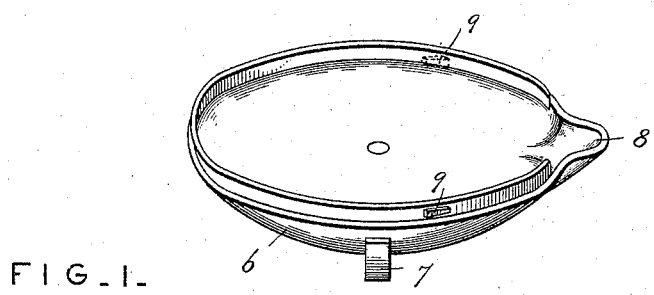
FIG. 1.
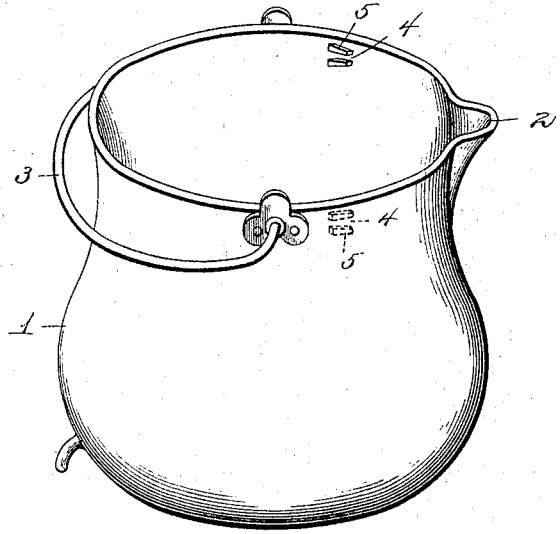
FIG. 2.
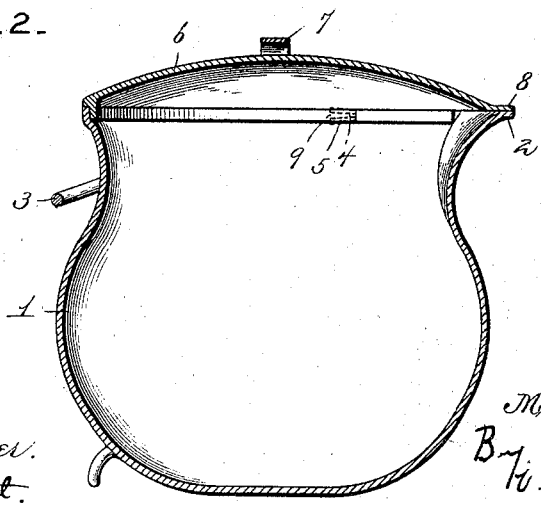
Witnesses
Harry L. Ames.
C. E. Hunt.
Inventor
Mary R. Brown.
By W. D. Stockbridge
Attorney

UNITED STATES PATENT OFFICE.

MARY R. BROWN, OF SWEDESBOROUGH, NEW JERSEY.

DEVICE FOR KEEPING LIDS ON BOILERS.

SPECIFICATION forming part of Letters Patent No. 608,103, dated July 26, 1898.

Application filed September 4, 1897. Serial No. 650,636. (No model.)

*To all whom it may concern:*

Be it known that I, MARY R. BROWN, a citizen of the United States, residing at Swedesborough, in the county of Gloucester and State of New Jersey, have invented certain new and useful Improvements in Devices for Keeping Lids on Boilers; and I do hereby declare the following to be a full, clear, and exact description of the invention, such as will enable others skilled in the art to which it appertains to make and use the same.

This invention relates to devices for securing lids or covers on boilers or cooking utensils; and it consists, essentially, of a cooking utensil having guides on the inner upper portions thereof to receive projections carried by the lid or cover adjacent to its perimeter, guides on one side converging and on the opposite side diverging in the direction of a pouring-lip, and projections on the lid correspondingly arranged.

The invention further consists of the details of construction and arrangement of the several parts, which will be more fully hereinafter described and claimed.

The object of the invention is to provide means for securely fastening a lid or cover of a boiler or cooking utensil, the construction of the parts being simple and effective, strong and durable, easily and readily applied, and comparatively inexpensive in the cost of manufacture.

In the accompanying drawings, Figure 1 is a perspective view of a cooking utensil and a lid or cover embodying the invention and shown in such positions as to illustrate the features of construction. Fig. 2 is a section on the line *x x* of Fig. 1, showing the parts united.

Referring to the drawings, wherein similar numerals of reference are employed to indicate corresponding parts in the views, the numeral 1 designates a cooking utensil of any preferred form and dimension, which has at the upper edge thereof a pouring-lip 2 of preferred configuration. The said utensil is also provided with a lifting-bail 3, and in the inner upper portion of opposite sides thereof are pairs of guides 4 and 5, the guides on one side converging and those on the opposite side diverging in the direction of the said lip.

The lid or cover 6 has a central handle or grip 7 and a covering-lip 8, adapted to fit over the pouring-lip 2, and depending from the lower side thereof are oppositely-disposed lugs 9, which are arranged similarly to and correspond in contour to the guides 4 and 5.

The lid or cover is placed upon the cooking utensil, and the parts are so positioned and proportioned that when the said lid or cover is fitted properly the reduced portions of the lugs 9 will be in line with the widest portions of the guides 4 and 5, and by slightly turning the said lid or cover to the right the said lugs will be forced into the guides and the covering-lip 8 brought to bear against the pouring-lip 2, thereby completely closing the utensil 1, and movement of the lid upwardly will be prevented. The degree of closure may be regulated by turning the lid or cover 6 only partially into the guides, leaving openings, if desired, or at any time the said lid or cover may be entirely removed from the utensil and its adjustment may be regulated in accordance with the character of the vegetables or materials being cooked. The construction is also adapted to be applied to ordinary cylindrical washboilers or to any other devices where it is desired and found applicable.

The boilers and the cooking utensils now in use mostly require the use of one hand to hold them by their bails and the other hand to retain the lid in position while draining the water from the utensil, and it frequently occurs that the steam scalds the hands. By the improved construction heretofore set forth the utensil is operated from the side by means of the bail 3, and by a simple turn of the lid or cover the lugs 9 are moved in the guides 4 and 5, providing an opening at one side or uncovering the pouring-lip 2 and permitting the water to be easily drained from the utensil without requiring the lid to be held in position, it being understood that the guides are long enough to permit this arrangement without entirely loosening the lid or cover from the utensil.

It is obviously apparent that many minor changes in the details of construction and arrangement of the several parts might be made and substituted for those shown and described without in the least departing from the nature or spirit of the invention.

Having thus described the invention, what is claimed as new is—

A cooking utensil having guides on each side thereof near its top, and a pouring-lip, the guides on one side converging and those on the opposite side diverging in the direction of the lip, in combination with a lid or cover having a covering-lip and carrying lugs, said lugs conforming in contour and adapted to engage said guides when the lid or cover is rotated.

In testimony whereof I have signed this specification in the presence of two subscribing witnesses.

MARY R. BROWN.

Witnesses:
JNO. C. RULON,
GEO. W. ASHTON.